United States Patent
Park et al.

(10) Patent No.: US 12,526,760 B2
(45) Date of Patent: Jan. 13, 2026

(54) UI/UX DISPLAY METHOD DURING TIMER T ADJUSTMENT DUE TO DISASTER ROAMING OCCURRENCE, AND APPARATUS FOR SUPPORTING SAME

(71) Applicant: LG ELECTRONICS INC., Seoul (KR)

(72) Inventors: Sangmin Park, Seoul (KR); Sungduck Chun, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 554 days.

(21) Appl. No.: 18/016,085

(22) PCT Filed: Jul. 12, 2021

(86) PCT No.: PCT/KR2021/008886
§ 371 (c)(1),
(2) Date: Jan. 13, 2023

(87) PCT Pub. No.: WO2022/014987
PCT Pub. Date: Jan. 20, 2022

(65) Prior Publication Data
US 2023/0269689 A1 Aug. 24, 2023

(30) Foreign Application Priority Data
Jul. 13, 2020 (KR) .................. 10-2020-0086294

(51) Int. Cl.
*H04W 60/00* (2009.01)
*H04W 8/06* (2009.01)
(Continued)

(52) U.S. Cl.
CPC ............. *H04W 60/00* (2013.01); *H04W 8/06* (2013.01); *H04W 8/12* (2013.01); *H04W 24/04* (2013.01)

(58) Field of Classification Search
CPC ......... H04W 60/00; H04W 8/06; H04W 8/12; H04W 24/04
See application file for complete search history.

(56) References Cited

U.S. PATENT DOCUMENTS 8,068,808 B2   11/2011   Smith
8,934,439 B2   1/2015    Smith et al.
(Continued)

FOREIGN PATENT DOCUMENTS

KR   20100077711    7/2010
WO   WO2020141964   7/2020

OTHER PUBLICATIONS

3GPP, "3rd Generation Partnership Project; Technical Specification Group Services and System Aspects; Study on Support for Minimization of Service Interruption (Release 17)," TR 22.831 V17.1.0, Dec. 2019, 19 pages.
(Continued)

*Primary Examiner* — Margaret G Webb
(74) *Attorney, Agent, or Firm* — Fish & Richardson P.C.

(57) ABSTRACT

A method for timer T adjustment due to disaster roaming occurrence, and an apparatus for supporting same. A user equipment (UE) determines that a disaster condition applies to a home public land mobile network (HPLMN). Upon selecting a disaster roaming PLMN, the UE performs a first registration procedure for disaster roaming services on the disaster roaming PLMN, and periodically attempts to obtain service on the HPLMN based on a timer T with a first value. Upon selecting a Visited PLMN (VPLMN), the UE performs a second registration procedure on the VPLMN, and periodically attempts to obtain service on the HPLMN based on a timer T with a second value.

15 Claims, 12 Drawing Sheets

(51) Int. Cl.
*H04W 8/12* (2009.01)
*H04W 24/04* (2009.01)

(56) References Cited

U.S. PATENT DOCUMENTS

| | | | | |
|---|---|---|---|---|
| 2008/0194253 | A1* | 8/2008 | Kuo | H04W 48/16 |
| | | | | 455/433 |
| 2016/0242138 | A1* | 8/2016 | Basavaraj | H04W 8/082 |
| 2017/0013542 | A1* | 1/2017 | Mackenzie | H04W 16/32 |
| 2019/0037484 | A1 | 1/2019 | Davies et al. | |
| 2019/0159115 | A1* | 5/2019 | Russell | H04W 60/005 |
| 2019/0268752 | A1 | 8/2019 | Buckley | |

OTHER PUBLICATIONS

3GPP, "3rd Generation Partnership Project; Technical Specification Group Services and System Aspects; Service requirements for the 5G system; Stage 1 (Release 17)," TS 22.261 V17.2.0, Mar. 2020, 83 pages.

* cited by examiner

UI/UX DISPLAY METHOD DURING TIMER T ADJUSTMENT DUE TO DISASTER ROAMING OCCURRENCE, AND APPARATUS FOR SUPPORTING SAME

CROSS-REFERENCE TO RELATED APPLICATIONS

This application is a National Stage filing under 35 U.S.C. § 371 of International Application No. PCT/KR2021/008886, filed on Jul. 12, 2021, which claims the benefit of Korean Patent Application No. 10-2020-0086294, filed on Jul. 13, 2020, the contents of which are hereby incorporated by reference in their entirety.

CROSS-REFERENCE TO RELATED APPLICATIONS

This application is a National Stage filing under 35 U.S.C. § 371 of International Application No. PCT/KR2021/008886, filed on Jul. 12, 2021, which claims the benefit of Korean Patent Application No. 10-2020-0086294, filed on Jul. 13, 2020, the contents of which are hereby incorporated by reference in their entirety.

TECHNICAL FIELD

The present disclosure relates to a method for displaying a User Interface (UI)/User eXperience (UX) when a timer T is adjusted due to disaster roaming and a device supporting the same.

BACKGROUND

5G New Radio (NR) is a new radio access technology (RAT) developed by 3rd Generation Partnership Project (3GPP) for the 5G (fifth generation) mobile network. It was designed to be the global standard for the air interface of 5G networks. The NR targets a single technical framework addressing all usage scenarios, requirements and deployment scenarios including enhanced Mobile Broadband (eMBB), massive Machine-Type Communications (mMTC), Ultra-Reliable and Low Latency Communications (URLLC), etc. The NR shall be inherently forward compatible.

In 3GPP Rel-17, a Minimization of service interruption (MINT) is being discussed in which, in the event of a disaster, a user receiving a communication service from a communication operator affected by the disaster roams to a network of neighboring another communication operator so that the communication service can be continuously received.

SUMMARY

Even while receiving disaster roaming service from the disaster roaming PLMN by applying the MINT, the UE may perform PLMN search and search for the HPLMN in which disaster has occurred. However, this PLMN search is an unnecessary operation unless the disaster is recovered from the HPLMN.

One aspect of the present disclosure is to provide a method and apparatus for displaying related information through a User Interface (UI)/User eXperience (UX) when a timer T for HPLMN search is adjusted due to a disaster roaming occurrence.

In an aspect, a method performed by a user equipment (UE) operating in a wireless communication system is provided. The method comprises, displaying first information informing that a disaster condition applies for a Home Public Land Mobile Network (HPLMN), and displaying second information informing that a specific PLMN has been selected from among at least one PLMN other than the HPLMN. Also, the method comprises, based on the specific PLMN being a disaster roaming PLMN, registering with the disaster roaming PLMN. Upon registering with the disaster roaming PLMN, a timer for periodically searching for the HPLMN does not operate, and while the timer is not running, the HPLMN is not searched. Also, the method comprises displaying third information informing that an attempt to access the HPLMN is stopped while the timer is not running. Also, the method comprises, based on the disaster condition no longer applying for the HPLMN and/or the UE leaving a disaster area, i) restarting the timer, and ii) displaying fourth information informing that the disaster condition no longer applies to the HPLMN and/or that the UE leaves the disaster area.

In another aspect, an apparatus for implementing the above method is provided.

The present disclosure can have various advantageous effects.

For example, when adjusting the timer T for HPLMN search due to the occurrence of disaster roaming, various related information can be effectively displayed to the user through the display.

For example, when a disaster situation occurs in a 5G system, it is possible to prevent the UE from unnecessarily searching for the HPLMN while receiving service through the PLMN for disaster roaming.

For example, it is possible to prevent service interruption or unnecessary power consumption in a disaster roaming PLMN due to unnecessary HPLMN search.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
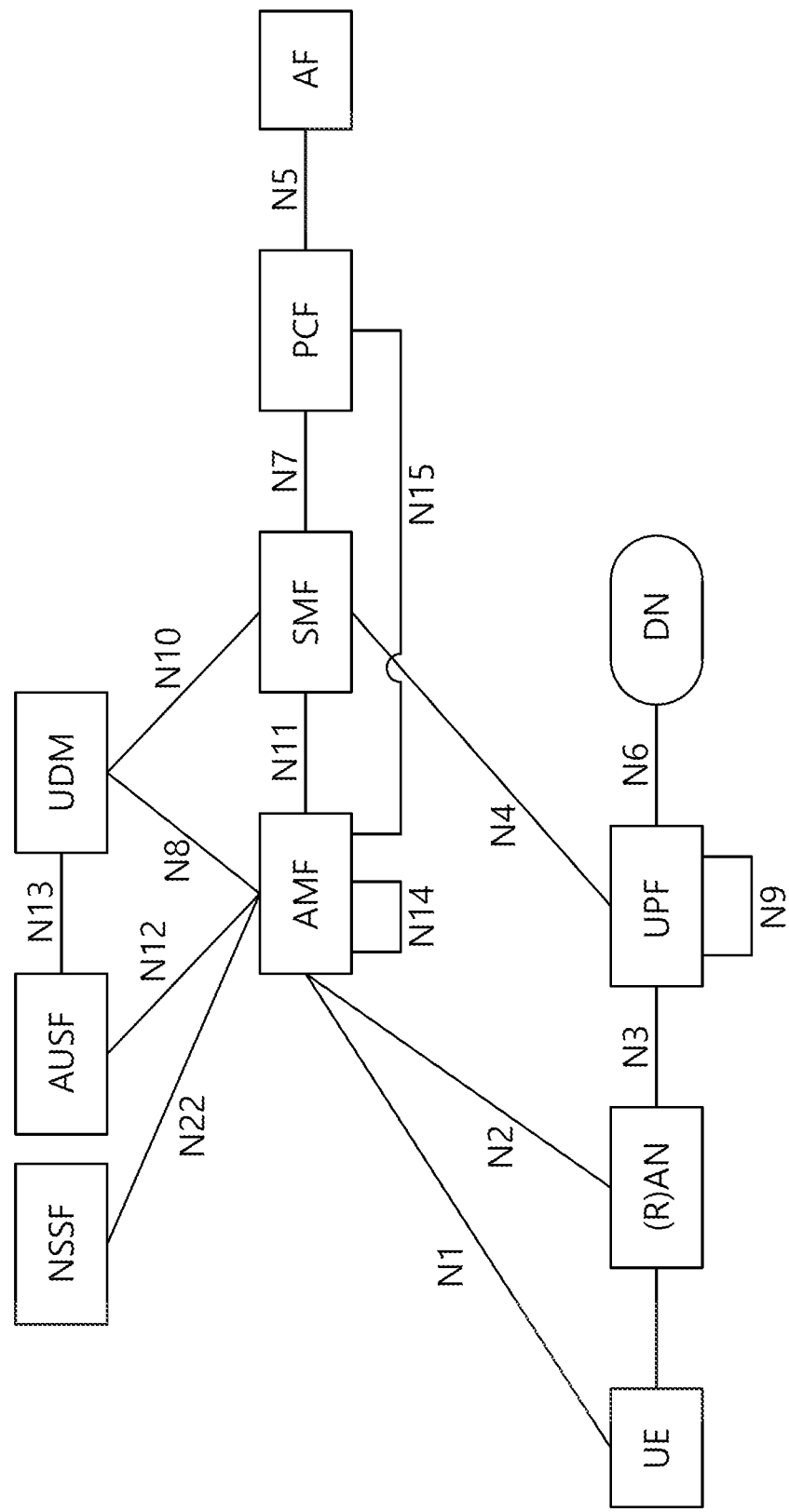
FIG. 1 shows an example of 5G system architecture to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of 5G system architecture to which implementations of the present disclosure is applied.

The 5G system (5GS) architecture consists of the following network functions (NF).
 Authentication Server Function (AUSF)
 Access and Mobility Management Function (AMF)
 Data Network (DN), e.g., operator services, Internet access or 3rd party services
 Unstructured Data Storage Function (UDSF)
 Network Exposure Function (NEF)
 Intermediate NEF (I-NEF)
 Network Repository Function (NRF)
 Network Slice Selection Function (NSSF)
 Policy Control Function (PCF)
 Session Management Function (SMF)
 Unified Data Management (UDM)
 Unified Data Repository (UDR)
 User Plane Function (UPF)
 UE radio Capability Management Function (UCMF)
 Application Function (AF)
 User Equipment (UE)
 (Radio) Access Network ((R)AN)
 5G-Equipment Identity Register (5G-EIR)
 Network Data Analytics Function (NWDAF)
 CHarging Function (CHF)

Furthermore, the following network functions may be considered.
 Non-3GPP InterWorking Function (N3IWF)
 Trusted Non-3GPP Gateway Function (TNGF)
 Wireline Access Gateway Function (W-AGF)

FIG. 1 depicts the 5G system architecture in the non-roaming case, using the reference point representation showing how various network functions interact with each other.

In FIG. 1, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 1. For clarity, the NWDAF and its connections with other NFs, e.g., PCF, are not depicted in FIG. 1.

The 5G system architecture contains the following reference points:
 N1: Reference point between the UE and the AMF.
 N2: Reference point between the (R)AN and the AMF.
 N3: Reference point between the (R)AN and the UPF.
 N4: Reference point between the SMF and the UPF.
 N6: Reference point between the UPF and a Data Network.
 N9: Reference point between two UPFs.

The following reference points show the interactions that exist between the NF services in the NFs.
 N5: Reference point between the PCF and an AF.
 N7: Reference point between the SMF and the PCF.
 N8: Reference point between the UDM and the AMF.
 N10: Reference point between the UDM and the SMF.
 N11: Reference point between the AMF and the SMF.
 N12: Reference point between the AMF and the AUSF.
 N13: Reference point between the UDM and the AUSF.
 N14: Reference point between two AMFs.
 N15: Reference point between the PCF and the AMF in the case of non-roaming scenario, PCF in the visited network and AMF in the case of roaming scenario.
 N16: Reference point between two SMFs. (in roaming case between SMF in the visited network and the SMF in the home network).
 N22: Reference point between the AMF and the NSSF.

In some cases, a couple of NFs may need to be associated with each other to serve a UE.

In order for the UE to receive service, the UE selects one of Public Land Mobile Networks (PLMNs) that can be physically accessed from where the UE is located. When the UE accesses a Visited PLMN (VPLMN) rather than a Home PLMN (HPLMN), the UE may periodically search for the HPLMN.

More specifically, if the UE is in a VPLMN, the MS may periodically attempt to obtain service on its HPLMN (if the Equivalent HPLMN (EHPLMN) list is not present or is empty) or one of its EHPLMNs (if the EHPLMN list is present) or a higher priority PLMN/access technology combinations listed in "user controlled PLMN selector" or "operator controlled PLMN selector" by scanning in accordance with the requirements that are applicable as defined in the automatic network selection mode. In the case that the UE has a stored "Equivalent PLMNs" list, the UE may only select a PLMN if it is of a higher priority than those of the same country as the current serving PLMN which are stored in the equivalent PLMNs list. For this purpose, a value of timer T may be stored in the SIM. The interpretation of the stored value of time T depends on the radio capabilities supported by the UE.

For a UE that does not support any of Extended Coverage GSM IoT (EC-GSM-IoT), Category M1 or Category NB1, T may be either in the range 6 minutes to 8 hours in 6 minute steps or it may indicate that no periodic attempts shall is made. If no value for T is stored in the SIM, a default value of 60 minutes may be used for T.

For a UE that only supports any one of or a combination of EC-GSM-IoT, Category M1 or Category NB1, T may be either in the range 2 hours to 240 hours, using 2 hour steps from 2 hours to 80 hours and 4 hour steps from 84 hours to 240 hours, or it may indicate that no periodic attempts is made. If no value for T is stored in the SIM, a default value of 72 hours may be used.

For a UE that supports both:

a) any one of or a combination of EC-GSM-IoT, Category M1 or Category NB1; and b) any access technology other than EC-GSM-IoT, Category M1 or Category NB1, then T may be interpreted depending on the access technology in use as specified below:

1) if the UE is using, at the time of starting timer T, any one of EC-GSM-IoT, Category M1 or Category NB1, T may be either in the range 2 hours to 240 hours, using 2 hour steps from 2 hours to 80 hours and 4 hour steps from 84 hours to 240 hours, or it may indicate that no periodic attempts is made. If no value for T is stored in the SIM, a default value of 72 hours may be used.

2) if the UE is not using, at the time of starting timer T, any of EC-GSM-IoT, Category M1 or Category NB1, T may be either in the range 6 minutes to 8 hours in 6 minute steps or it may indicate that no periodic attempts is made. If no value for T is stored in the SIM, a default value of 60 minutes may be used for T.

If the UE is configured with the MinimumPeriodicSearchTimer, the UE should not use a value for T that is less than the MinimumPeriodicSearchTimer. If the value stored in the SIM, or the default value for T (when no value is stored in the SIM), is less than the MinimumPeriodicSearchTimer, then T is set to the MinimumPeriodicSearchTimer.

The UE does not stop timer T when it activates power saving mode (PSM).

The UE may be configured for Fast First Higher Priority PLMN search. Fast First Higher Priority PLMN search is enabled if the corresponding configuration parameter is present and set to enabled. Otherwise, Fast First Higher Priority PLMN search is disabled.

The attempts to access the HPLMN or an EHPLMN or higher priority PLMN may be as specified below.

a) The periodic attempts are only be performed in automatic network selection mode when the UE is roaming, and not while the UE is attached for emergency bearer services, is registered for emergency services, has a PDU session for emergency services or has a PDN connection for emergency bearer services;

b) The UE makes the first attempt after a period of at least 2 minutes and at most T minutes:

only after switch on if Fast First Higher Priority PLMN search is disabled; or after switch on or upon selecting a VPLMN if Fast First Higher Priority PLMN search is enabled.

c) The UE makes the following attempts if the UE is on the VPLMN at time T after the last attempt.

d) Periodic attempts are only be performed by the UE while in idle mode.

d1) Periodic attempts may be postponed while the UE is in PSM.

d2) Periodic attempts may be postponed while the MS is receiving enhanced Multimedia Broadcast Multicast Services (eMBMS) transport service in idle mode.

e) If the HPLMN (if the EHPLMN list is not present or is empty) or a EHPLMN (if the list is present) or a higher priority PLMN is not found, the UE remains on the VPLMN.

f) The UE limits its attempts to access higher priority PLMN/access technology combinations to PLMN/access technology combinations of the same country as the current serving VPLMN.

g) Only the priority levels of equivalent PLMNs of the same country as the current serving VPLMN are taken into account to compare with the priority level of a selected PLMN.

h) If the PLMN of the highest priority PLMN/access technology combination available is the current VPLMN, or one of the PLMNs in the Equivalent PLMNs list, the UE remains on the current PLMN/access technology combination.

Hereinafter, minimization of service interruption (MINT) will be described. S3.1 and S6.31 of 3GPP TS 22.261 V17.2.0 (2021-03) may be referred.

Mobile communication service is becoming an indispensable service in daily life, and communication operators are making various attempts to prevent service interruption. For example, a communication operator may install multiple wired networks in a core network section (e.g., multiple wired networks between AMF and SMF), and even if a problem occurs in one wired network, communication services may be continuously provided using another wired network. Alternatively, a communication operator may install a plurality of core network nodes, such as AMF, so that even if a problem occurs in one core network node, other core network nodes perform backup to prevent communication services from being disconnected.

However, in the event of a disaster such as fire or earthquake, the above countermeasures may not be helpful. For example, in the event of a fire, all communication networks connected to the outside from one node of the wireless network may be lost. In addition, in a virtualized cloud environment, a plurality of core network nodes is likely to be installed in one data center located in the same region. Therefore, if a fire or an earthquake occurs in an area where a data center is located, there is a high possibility that functions of all core network nodes will be lost no matter how many core network nodes are installed.

The most efficient way to prevent interruption of communication services in the event of a disaster is to use roaming. That is, if communication service cannot be received from the communication operator to which the user subscribed due to a disaster, interruption of communication service can be prevented by roaming to another nearby communication operator's network to receive communication service. More specifically, each communication operator may actively install a wireless network and a core network in an area (e.g., one country) for which it is licensed. Different communication operators may construct networks in different ways and/or install core network nodes in different buildings, so even if a disaster occurs, it may not affect all communication operators equally. That is, a problem that occurs in one communication operator may not be equally likely to occur in another communication operator.

Figure 2:
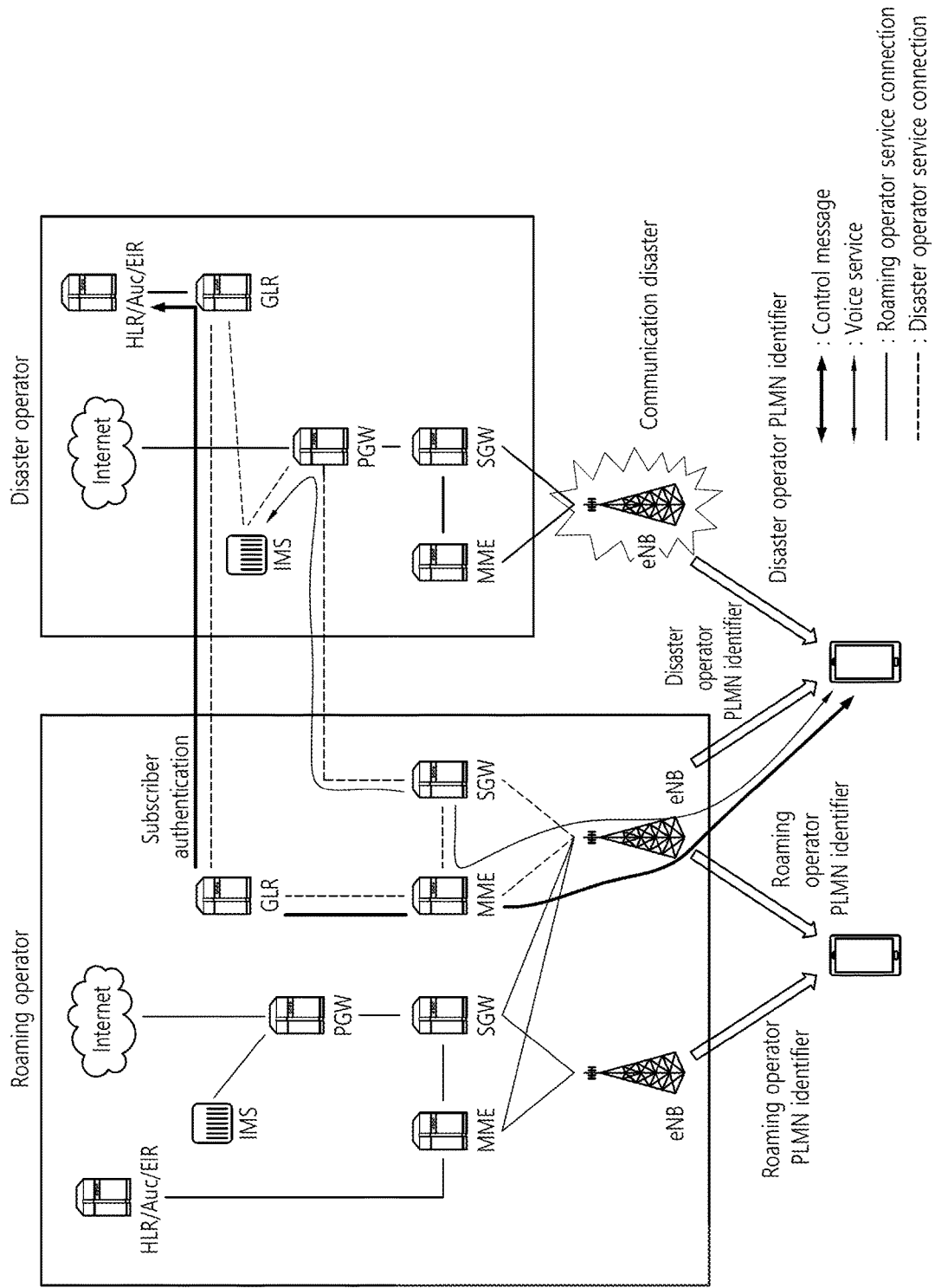
FIG. 2 shows a concept of MINT to which implementations of the present disclosure is applied.

FIG. 2 shows a concept of MINT to which implementations of the present disclosure is applied.

Referring to FIG. 2, when a disaster occurs, the roaming operator can accommodate subscribers of the disaster operator by broadcasting the PLMN identifier of the disaster operator. In addition, in order to accommodate subscribers of the disaster operator in case of a disaster, the PLMN identifier of the disaster operator is registered in the core network of the roaming operator, the wireless network broadcasts the corresponding PLMN identifier in the System Information Block (SIB) message, and traffic can be mutually transmitted through the core network between operators.

In order to enable the third party to accommodate its roaming subscribers in the event of a communication disaster of its own and/or to accommodate third-party subscribers in the event of a third-party communication disaster, each operator may build a core network node (e.g., MME, S-GW, P-GW) for disaster roaming.

In normal times, the corresponding system should be ready to accept roaming calls through preliminary network interworking between operators, and may accommodate roaming calls between operators by taking follow-up measures according to occurrence criteria when a communication disaster occurs. Pre- and post-measures may follow consultations between operators.

In FIG. 2, it is shown as an example that MINT is applied in an Evolved Packet System (EPS), but MINT may also be applied in a 5G system.

Regarding MINT, the following terms may be defined.

Disaster Condition: This is the condition that a government decides when to initiate and terminate (e.g., a natural disaster). When this condition applies, users may have the opportunity to mitigate service interruptions and failures.

Disaster Inbound Roamer: A user that (a) cannot get service from the PLMN it would normally be served by, due to failure of service during a Disaster Condition, and (b) is able to register with other PLMNs.

Disaster Roaming: This is the special roaming policy that applies during a Disaster Condition.

Regarding MINT, the following requirements may be considered.

A mobile network may fail to provide service in the event of a disaster (e.g., a fire.) The 5GS may provide functionality to mitigate interruption of service. If there are PLMN operators prepared to offer service, UEs may obtain service from the corresponding PLMN in the event of a disaster. MINT is constrained to a particular time and place. To reduce the impact to the 5G system of supporting Disaster Roaming, the potential congestion resulting from an influx or outflux of Disaster Inbound Roamers is taken into account.

Subject to regulatory requirements or operator's policy, 3GPP system may be able to enable a UE of a given PLMN to obtain connectivity service (e.g., voice call, mobile data service) from another PLMN for the area where a Disaster Condition applies.

The 3GPP system may enable UEs to obtain information that a Disaster Condition applies to a particular PLMN or PLMNs.

If a UE has no coverage of its Home PLMN (HPLMN), then obtains information that a Disaster Condition applies to the UE's HPLMN, the UE may register with a PLMN offering Disaster Roaming service.

The 3GPP system may support means for a PLMN operator to be aware of the area where Disaster Condition applies.

The 3GPP system may be able to support provision of service to Disaster Inbound Roamer only within the specific region where Disaster Condition applies.

The 3GPP system may be able to provide efficient means for a network to inform Disaster Inbound roamers that a Disaster Condition is no longer applicable.

Subject to regulatory requirements or operator's policy, the 3GPP system may support a PLMN operator to be made aware of the failure or recovery of other PLMN(s) in the same country when the Disaster Condition is applies, or when the Disaster Condition is not applicable.

The 3GPP system may be able to provide means to enable a UE to access PLMNs in a forbidden PLMN list if a Disaster condition applies and no other PLMN is available except for PLMNs in the forbidden PLMN list.

The 3GPP system may provide means to enable that a Disaster Condition applies to UEs of a specific PLMN.

The 3GPP system may be able to provide a resource efficient means for a PLMN to indicate to potential Disaster Inbound Roamers whether they can access the PLMN or not.

Disaster Inbound Roamers may perform network reselection when a Disaster Condition has ended.

The 3GPP system may minimize congestion caused by Disaster Roaming.

3GPP system may be able to collect charging information for a Disaster Inbound Roamer with information about the applied disaster condition.

Regarding access control for a UE that satisfies the Disaster Condition, access identity number 4 may be applied. The configuration may be valid for PLMNs that indicate to potential Disaster Inbound Roamers that the UEs can access the PLMN.

Regarding the MINT, network selection may be performed as follows.

At switch on, when in coverage of the last registered PLMN as stored in the Subscriber Identification Module (SIM)/Universal SIM (USIM), the UE attaches to that network.

As an option, in automatic selection mode, when no Equivalent HPLMN (EHPLMN) list is present, the UE may select the HPLMN. When the EHPLMN list is present, the UE may select the highest priority EHPLMN among the available EHPLMNs. The operator may able to control the UE behavior by USIM configuration.

As an option, if the UE is in manual network selection mode at switch-on if the last registered PLMN is unavailable and no equivalent PLMN is available, and nd the UE finds it is in coverage of either the HPLMN or an EHPLMN then the UE may register on the corresponding HPLMN or EHPLMN. The UE remains in manual network selection mode.

If the UE returns to coverage of the PLMN on which it is already registered (as indicated by the registered PLMN stored in the SIM/USIM), the UE may perform a location update to a new location area if necessary. As an alternative option to this, if the UE is in automatic network selection mode and it finds coverage of the HPLMN or any EHPLMN, the UE may register on the HPLMN (if the EHPLMN list is not present) or the highest priority EHPLMN of the available EHPLMNs (if the EHPLMN list is present) and not return to the last registered PLMN. If the EHPLMN list is present and not empty, it may be used. The operator may be able to control by USIM configuration whether a UE that supports this option shall follow this alternative behavior.

The default behavior for a UE is to select the last registered PLMN.

If there is no registered PLMN stored in the SIM/USIM, or if this PLMN is unavailable and no equivalent PLMN is available, or the attempted registration fails, the UE may follow one of the following procedures for network selection.

A) Automatic Network Selection Mode

The UE may select and attempt registration on other PLMNs, if available and allowable, if the location area is not in the list of "forbidden LAs for roaming" and the tracking area is not in the list of "forbidden TAs for roaming", in the following order.

i) An EHPLMN if the EHPLMN list is present or the HPLMN (derived from the International Mobile Subscriber Identity (IMSI)) if the EHPLMN list is not present, for preferred access technologies in the order specified. In the case that there are multiple EHPLMNs present then the highest priority EHPLMN is selected.

ii) each entry in the "User Controlled PLMN Selector with Access Technology" data field in the SIM/USIM (in priority order).

iii) each entry in the "Operator Controlled PLMN Selector with Access Technology" data field in the SIM/USIM (in priority order).

iv) other PLMN/access technology combinations with sufficient received signal quality in random order.

v) all other PLMN/access technology combinations in order of decreasing signal quality.

It may be possible to configure a voice capable UE so that it shall not attempt registration on a PLMN if all cells identified as belonging to the PLMN do not support the corresponding voice service.

In the case of a UE operating in UE operation mode A or B, an allowable PLMN is one which is not in the Forbidden PLMN data field in the SIM/USIM. This data field may be extended in the Mobile Equipment (ME) memory. In the case of a UE operating in UE operation mode C, an allowable PLMN is one which is not in the Forbidden PLMN data field in the SIM/USIM or in the list of forbidden PLMNs for GPRS service in the ME. When there is no available PLMN except for PLMNs in the Forbidden PLMN data field in the SIM/USIM, and the available PLMNs indicate that Disaster Condition applies, this PLMN may be considered allowable for registration to the UE while the Disaster Condition is applicable.

If successful registration is achieved, the UE may indicate the selected PLMN.

If registration cannot be achieved on any PLMN and at least one PLMN offering restricted local operator services has been found, the UE may obtain user consent for restricted local operator services and the UE may use a list of preferred PLMNs for restricted local operator services stored in the ME. If none of the preferred PLMNs for restricted local operator services is available, the UE may select any available PLMN offering restricted local operator services. If one of these PLMNs for restricted local operator service is chosen, the UE may indicate the choice. If none are selected, the UE may wait until a new PLMN is detected, or new location areas or tracking areas of an allowed PLMN are found which are not in the forbidden LA or TA list(s), and then repeat the procedure.

If registration cannot be achieved on any PLMN and no PLMN offering restricted local operator services has been found, the UE may indicate "no service" to the user, wait until a new PLMN is detected, or new location areas or tracking areas of an allowed PLMN are found which are not in the forbidden LA or TA list(s), and then repeat the procedure. When registration cannot be achieved, different (discontinuous) PLMN search schemes may be used in order to minimize the access time while maintaining battery life, e.g. by prioritizing the search in favor of Broadcast Control Channel (BCCH) carriers which have a high probability of belonging to an available and allowable PLMN.

B) Manual Network Selection Mode

The UE may indicate PLMNs, including Forbidden PLMNs, which are available. If there are none, this may also be indicated. The HPLMN of the user may provide on the USIM additional information about the available PLMNs, if this is provided then the UE may indicate that information to the user. This information, provided as free text may include the followings.

Preferred partner, roaming agreement status, supported services

Furthermore, the UE may indicate whether the available PLMNs are present on one of the PLMN selector lists (e.g., EHPLMN, User Controlled, Operator Controlled or Forbidden) as well as not being present on any of the lists.

For the purpose of presenting the names of the available PLMNs to the user, the ME may use the USIM defined names if available or other PLMN naming rules in priority order (Country/PLMN indication).

Any available PLMNs is presented in the following order.

i) HPLMN (if the EHPLMN list is not present), or if one or more of the EHPLMNs are available, then based on an optional data field on the USIM, either the highest priority available EHPLMN is to be presented to the user or all available EHPLMNs are presented to the user in priority order. If the data field is not present, then only the highest priority available EHPLMN is presented.

ii) PLMNs contained in the "User Controlled PLMN Selector" data field in the SIM/USIM (in priority order)

iii) PLMNs contained in the "Operator Controlled PLMN Selector" data field in the SIM/USIM (in priority order)

iv) other PLMN/access technology combinations with sufficient received signal level in random order v) all other PLMN/access technology combinations in order of decreasing signal strength.

If a PLMN does not support voice services, then this is indicated to the user.

The user may select the desired PLMN and the UE attempts registration on this PLMN (This may take place at any time during the presentation of PLMNs).

If registration cannot be achieved on any PLMN and at least one PLMN offering restricted local operator services has been found, the UE may obtain user consent for restricted local operator services and offer the user to select one of these networks. If one of these networks is selected, the UE may indicate the selected PLMN, wait until a new PLMN is detected, or new location areas or tracking areas of an allowed PLMN are found which are not in the forbidden LA or TA list(s), and then repeat the procedure.

If the registration cannot be achieved on any PLMN and no PLMN offering restricted local operator services is selected, the UE may indicate "No Service". The user may then select and attempt to register on another or the same PLMN following the above procedure. The UE shall not attempt to register on a PLMN which has not been selected by the user.

Once the UE has registered on a PLMN selected by the user, the UE does not automatically register on a different PLMN unless:
 i) The new PLMN is declared as an equivalent PLMN by the registered PLMN; or,
 ii) The user selects automatic mode.

If a PLMN is selected but the UE cannot register on it because registration is rejected with the cause "PLMN not allowed", the UE may add the PLMN to the Forbidden PLMN list. The UE shall not re-attempt to register on that network unless the same PLMN is selected again by the user.

If a PLMN is selected but the UE cannot register for Packet Switched (PS) services on it because registration is rejected with the cause "GPRS services not allowed in this PLMN", the UE shall not re-attempt to register for E-UTRAN or UTRAN PS or GSM EDGE Radio Access Network (GERAN) PS on that network. The PLMN is added to the list "Forbidden PLMN's for GPRS services". The UE shall not re-attempt to register for E-UTRAN or UTRAN PS or GERAN PS on that network unless the same PLMN is selected again by the user. The reception of the cause "GPRS services not allowed in this PLMN", does not affect the CS service.

If a PLMN is selected but the UE cannot register on it for other reasons, the UE may, upon detection of a new LA (not in a forbidden LA list) of the selected PLMN, attempt to register on the PLMN.

If the UE is registered on a PLMN but loses coverage, different (discontinuous) carrier search schemes may be used to minimize the time to find a new valid BCCH carrier and maintain battery life, e.g. by prioritizing the search in favor of BCCH carriers of the registered PLMN.

When a registration attempt by the UE is rejected by a network with an indication of "permanent" PLMN restriction, the PLMN identity may be written to a list of Forbidden PLMNs stored in a data field in the SIM/USIM.

If a successful registration is achieved on a PLMN in the Forbidden PLMN list, the corresponding PLMN may be deleted from the list. However, if successful registration is achieved on a PLMN in the Forbidden PLMN list while Disaster Condition applies, the PLMN may not be deleted from Forbidden PLMN list.

When in automatic mode, the UE may indicate any PLMNs which will not be selected due to their presence in the Forbidden PLMN list.

If a UE receives an equivalent PLMN list containing a PLMN which is included in the Forbidden PLMN list, this PLMN may be removed from the equivalent PLMN list before this is stored by the UE.

Figure 3:
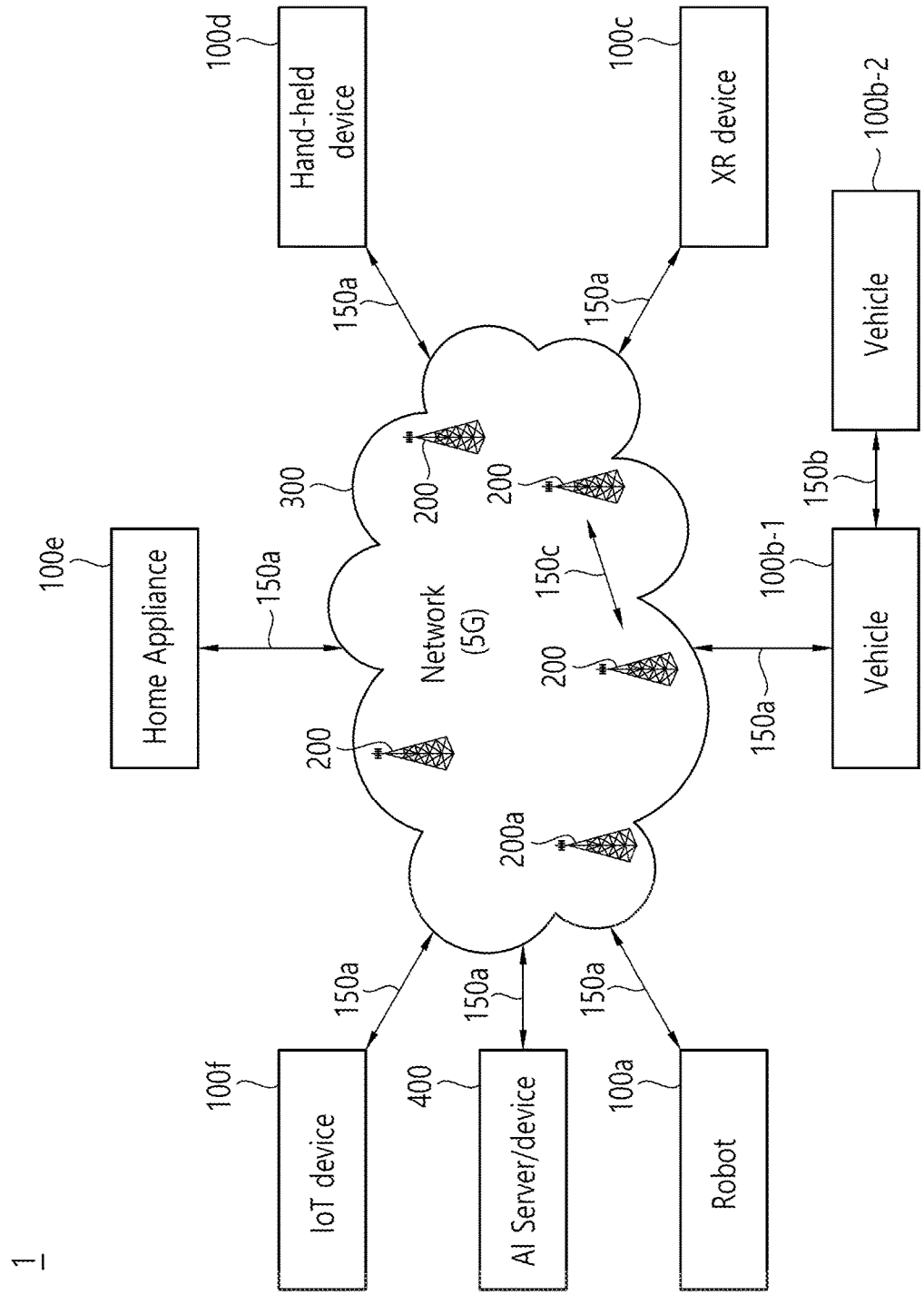
FIG. 3 shows an example of a communication system to which implementations of the present disclosure is applied.

FIG. 3 shows an example of a communication system to which implementations of the present disclosure is applied.

The 5G usage scenarios shown in FIG. 3 are only exemplary, and the technical features of the present disclosure can be applied to other 5G usage scenarios which are not shown in FIG. 3.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 3, the communication system 1 includes wireless devices 100a to 100f, base stations (BSs) 200, and a network 300. Although FIG. 3 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is. FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC).

For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 4:
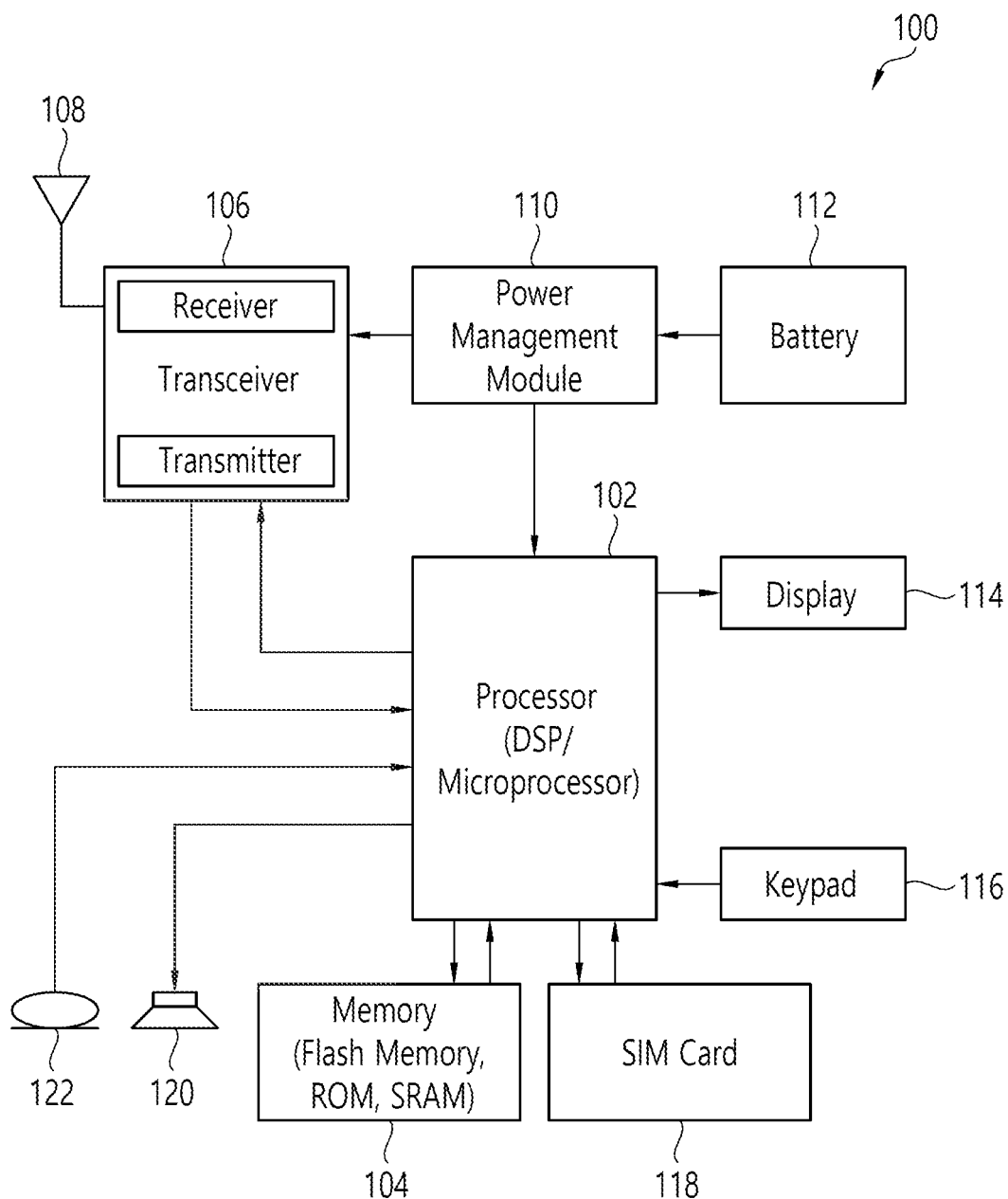
FIG. 4 shows an example of UE to which implementations of the present disclosure is applied.

FIG. 4 shows an example of UE to which implementations of the present disclosure is applied.

A UE 100 includes a processor 102, a memory 104, a transceiver 106, one or more antennas 108, a power management module 110, a battery 112, a display 114, a keypad 116, a SIM card 118, a speaker 120, and a microphone 122.

The processor 102 may be adapted to implement the descriptions, functions, procedures, suggestions, methods and/or operational flowcharts disclosed in the present disclosure. The processor 102 may be adapted to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include Application Specific Integrated Circuit (ASIC), other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek™, ATOM™ series of processors made by Intel® or a corresponding next generation processor.

The memory 104 is operatively coupled with the processor 102 and stores a variety of information to operate the processor 102. The memory 104 may include Read Only Memory (ROM), Random Access Memory (RAM), flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the IMSI number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
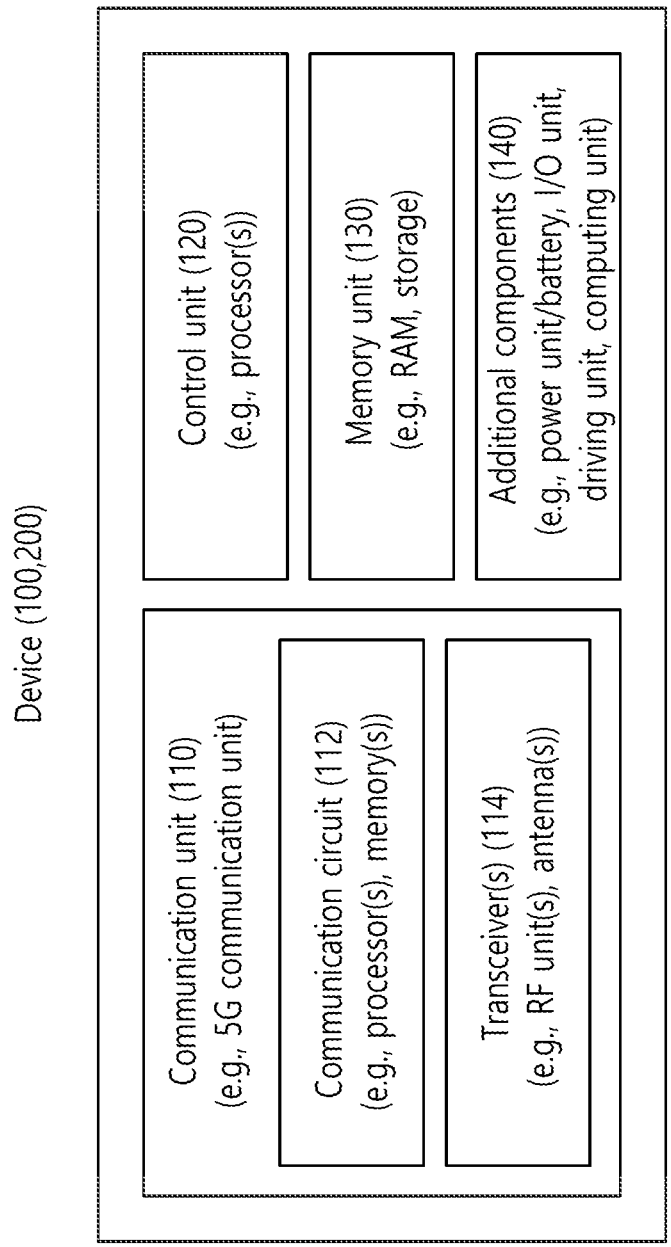
FIG. 5 shows an example of a wireless device to which implementations of the present disclosure is applied.

FIG. 5 shows an example of a wireless device to which implementations of the present disclosure is applied.

The wireless device may be implemented in various forms according to a use-case/service (refer to FIG. 3). The wireless device 100 or 200 of FIG. 5 may correspond to the UE 100 of FIG. 4.

Referring to FIG. 5, wireless devices 100 and 200 may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the processor 102 of FIG. 4 and/or the memory 104 of FIG. 4. For example, the transceiver(s) 114 may include the transceiver 106 of FIG. 4 and/or the one or more antennas 108 of FIG. 4. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 3), the vehicles (100b-1 and 100b-2 of FIG. 3), the XR device (100c of FIG. 3), the hand-held device (100d of FIG. 3), the home appliance (100e of FIG. 3), the IoT device (100f of FIG. 3), a digital broadcast terminal, a hologram device, a public safety device, an MTC device, a medicine device, a FinTech device (or a finance device), a security device, a climate/environment device, the AI server/device (400 of FIG. 3), the BSs (200 of FIG. 3), a network node, etc. The wireless devices 100 and 200 may be used in a mobile or fixed place according to a use-example/service.

In FIG. 5, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a dynamic RAM (DRAM), a ROM, a flash memory, a volatile memory, a non-volatile memory, and/or a combination thereof.

A disaster may occur while the UE camps on the RAN and/or cell of the HPLMN and is receiving service normally. Disasters can occur on various aspects of the network. For example, a disaster may occur in a function of a core network or in a section between a core network and a RAN node. In this case, problems may arise with PLMN selection when applying MINT and/or disaster roaming.

That is, even after the UE recognizes a disaster situation and proceeds with roaming to another neighboring PLMN, the UE may periodically perform PLMN search to reselect the HPLMN. If the UE does not move much, it is highly likely that the UE is still within the coverage of the RAN node (i.e., the RAN node is still within coverage), and since no disaster has occurred between the UE and the RAN node, the HPLMN may be exposed during the PLMN selection process. The HPLMN has the highest priority in the PLMN selection process. However, the registration procedure after selecting the HPLMN will naturally fail because a disaster has occurred in the section between the core network and the RAN node. As a result, such HPLMN selection not only has no meaning, but also causes a UE receiving a roaming service through disaster roaming to perform PLMN selection unnecessarily, which may cause service interruption.

Hereinafter, according to implementations of the present disclosure, when a disaster occurs in the communication network to which the UE is connected and communication services cannot be provided from the communication network, a method for preventing a UE from unnecessarily searching for or selecting an HPLMN in a situation where the UE selects another PLMN for disaster roaming is described.

In addition, according to implementations of the present disclosure, a method of displaying related information through User Interface (UI)/User eXperience (UX) when adjusting timer T for HPLMN search due to occurrence of disaster roaming is described.

When a disaster occurs, a response method may vary depending on the type of disaster or the entity in the system that becomes inoperable due to the occurrence of the disaster. In the present disclosure, it is assumed that a RAN node (e.g., eNB or gNB) itself has no problem, but a disaster occurs in some functions of the core network and/or a section/interface between the RAN node and the core network. In this case, the area in which service is interrupted due to the disaster may be an area covered by the RAN node or an area covered by the core network node (e.g., AMF) where the disaster occurs.

Hereinafter, UE and terminal may be used interchangeably. Various implementations and/or embodiments of the present disclosure to be described below may be applied to various services, such as eMBB, V2X communication, public safety, IoT, etc. In addition, various implementations and/or embodiments of the present disclosure to be described below may be applied to various types of terminals, e.g., smart phones, vehicles. IoT terminals, robots, etc.

Various implementations and/or embodiments of the present disclosure to be described below may be individually performed, or two or more may be combined to be performed in a complex manner. In addition, combinations of one or more actions/configurations/steps of various implementations and/or embodiments of the present disclosure described below may be performed.

According to implementations of the present disclosure, after recognizing the disaster situation (i.e., after recognizing that the disaster condition is satisfied in the HPLMN), the UE may perform a registration procedure by selecting another PLMN that provides roaming including disaster roaming.

According to implementations of the present disclosure, if the selected PLMN is a disaster roaming PLMN, the UE may stop the timer T for periodically searching for the HPLMN. When the timer T is stopped, the UE may not perform an operation of searching for the HPLMN until the timer T is restarted when a specific condition is satisfied or the original value is applied. In this case, stopping the timer T may include not starting the timer T in the first place when the selected PLMN is a disaster roaming PLMN. Alternatively, when the selected PLMN is the disaster roaming PLMN, the UE may change and apply the value of the timer T for periodically searching for the HPLMN. For example, the UE may evaluate the value of timer T for HPLMN search by considering information obtained when recognizing a disaster in the HPLMN (e.g., information about disaster area) or other candidate PLMNs, and depending on the evaluation result, the UE may adjust and apply a longer value of the timer T.

According to implementations of the present disclosure, when the selected PLMN is a normal PLMN rather than a disaster roaming PLMN, the UE may evaluate the value of the timer T for HPLMN search by considering information obtained when recognizing a disaster in the HPLMN (e.g., information about a disaster area) or other candidate PLMNs. Depending on the evaluation result, the UE may apply the timer T as it is, adjust the value to a longer value, or stop the timer T.

According to the implementation of the present specification, the conditions for restarting the timer T or applying the original value may include 1) recognizing that the disaster situation has ended, 2) not recognizing that the disaster situation has ended, but moving to a normal VPLMN, or 3) leaving the disaster roaming area.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 6:
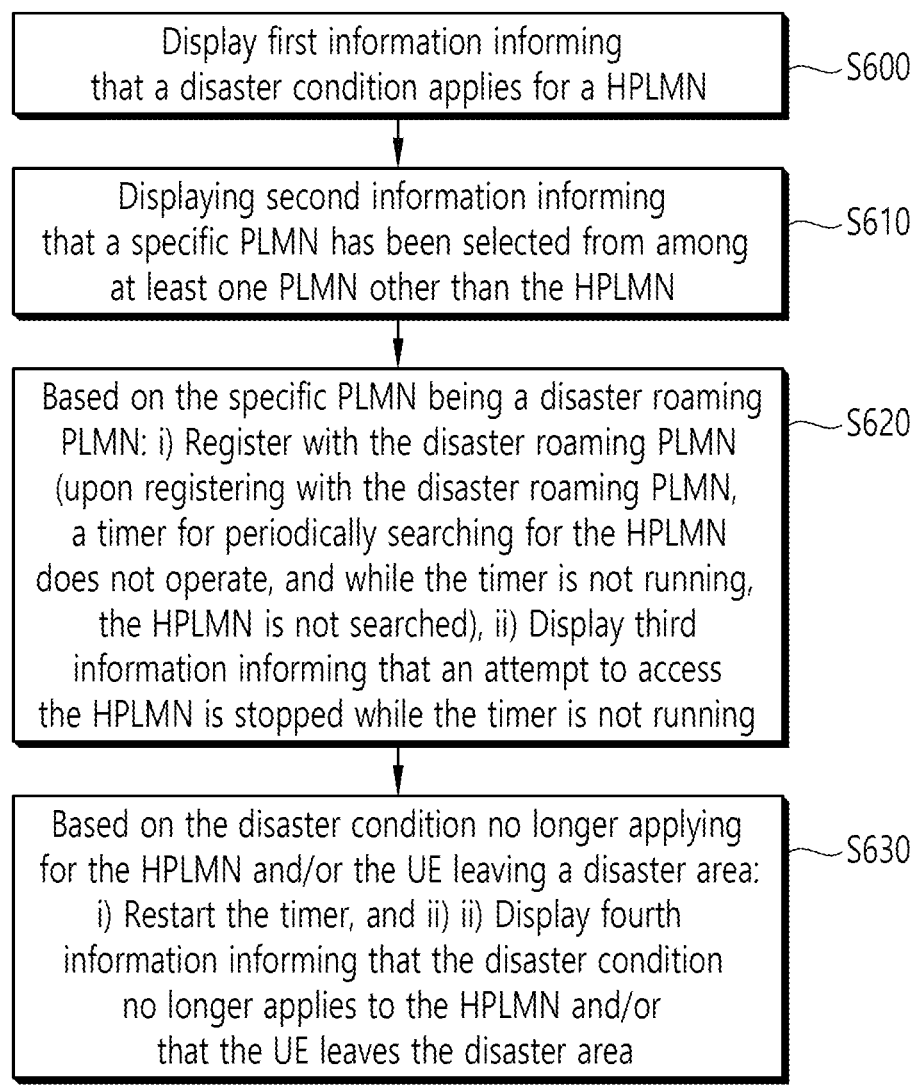
FIG. 6 shows an example of a method performed by a UE to which implementations of the present disclosure is applied.

FIG. 6 shows an example of a method performed by a UE to which implementations of the present disclosure is applied.

In step S600, the method comprises displaying first information informing that a disaster condition applies for a HPLMN.

In some implementations, the disaster condition may be a problem in an interface between a RAN node of the HPLMN and a core network related to the HPLMN.

In some implementations, the first information may include the disaster area.

In step S610, the method comprises displaying second information informing that a specific PLMN has been selected from among at least one PLMN other than the HPLMN.

In step S620, the method comprises, based on the specific PLMN being a disaster roaming PLMN, registering with the disaster roaming PLMN. Upon registering with the disaster roaming PLMN, a timer for periodically searching for the HPLMN does not operate, and while the timer is not running, the HPLMN is not searched. Also, the method comprises displaying third information informing that an attempt to access the HPLMN is stopped while the timer is not running.

In some implementations, the timer may operate after selecting the disaster roaming PLMN.

In some implementations, the method may further comprise evaluating a time point at which the HPLMN becomes available again, based on the specific PLMN being a normal PLMN that is not the disaster roaming PLMN. The time point at which the HPLMN becomes available again may be evaluated based on a size of the disaster area and/or candidate PLMNs within the disaster area. According to the evaluation, a value of the timer may be adjusted to be longer than a specified value.

In step S630, the method comprises, based on the disaster condition no longer applying for the HPLMN and/or the UE leaving a disaster area, restarting the timer, and displaying fourth information informing that the disaster condition no longer applies to the HPLMN and/or that the UE leaves the disaster area.

In some implementations, the disaster condition no longer applying to the HPLMN may be recognized based on an indicator received from the disaster roaming PLMN or a deregistration procedure initiated by a network in the disaster roaming PLMN.

In some implementations, the UE may be in communication with at least one of a mobile device, a network, and/or autonomous vehicles other than the UE.

Furthermore, the method in perspective of the UE described above in FIG. 6 may be performed by the UE 100 shown in FIG. 4 and/or the wireless device 100 shown in FIG. 5.

More specifically, the UE comprises at least one display, at least one transceiver, at least one processor, and at least one memory operably connectable to the at least one processor. The at least one memory stores instructions to cause the at least one processor to perform operations below.

The UE displays, via the at least one display, first information informing that a disaster condition applies for a HPLMN.

In some implementations, the disaster condition may be a problem in an interface between a RAN node of the HPLMN and a core network related to the HPLMN.

In some implementations, the first information may include the disaster area.

The UE displays, via the at least one display, second information informing that a specific PLMN has been selected from among at least one PLMN other than the HPLMN.

The UE, based on the specific PLMN being a disaster roaming PLMN, registers with the disaster roaming PLMN. Upon registering with the disaster roaming PLMN, a timer for periodically searching for the HPLMN does not operate, and while the timer is not running, the HPLMN is not searched. Also, the UE displays, via the at least one display, third information informing that an attempt to access the HPLMN is stopped while the timer is not running.

In some implementations, the timer may operate after selecting the disaster roaming PLMN.

In some implementations, the UE may further evaluate a time point at which the HPLMN becomes available again, based on the specific PLMN being a normal PLMN that is not the disaster roaming PLMN. The time point at which the HPLMN becomes available again may be evaluated based on a size of the disaster area and/or candidate PLMNs within the disaster area. According to the evaluation, a value of the timer may be adjusted to be longer than a specified value.

The UE, based on the disaster condition no longer applying for the HPLMN and/or the UE leaving a disaster area, restarts the timer, and displays, via the at least one display, fourth information informing that the disaster condition no longer applies to the HPLMN and/or that the UE leaves the disaster area.

In some implementations, the disaster condition no longer applying to the HPLMN may be recognized based on an indicator received from the disaster roaming PLMN or a deregistration procedure initiated by a network in the disaster roaming PLMN.

Furthermore, the method in perspective of the UE described above in FIG. 6 may be performed by control of the processor 102 included in the UE 100 shown in FIG. 4 and/or by control of the communication unit 110 and/or the control unit 120 included in the wireless device 100 shown in FIG. 5.

More specifically, a processing apparatus operating in a wireless communication system comprises at least one processor, and at least one memory operably connectable to the at least one processor. The at least one processor is adapted to perform operations comprising: displaying first information informing that a disaster condition applies for a HPLMN, displaying second information informing that a specific PLMN has been selected from among at least one PLMN other than the HPLMN, based on the specific PLMN being a disaster roaming PLMN, i) registering with the disaster roaming PLMN, wherein, upon registering with the disaster roaming PLMN, a timer for periodically searching for the HPLMN does not operate, and while the timer is not running, the HPLMN is not searched, ii) displaying third information informing that an attempt to access the HPLMN is stopped while the timer is not running, based on the disaster condition no longer applying for the HPLMN and/or the UE leaving a disaster area, i) restarting the timer, and ii) displaying fourth information informing that the disaster condition no longer applies to the HPLMN and/or that the UE leaves the disaster area.

Hereinafter, various implementations of the present disclosure are described in detail.

1. First Implementation

The UE may recognize a disaster occurrence situation in any way. Upon recognizing the occurrence of a disaster, the UE may move to the disaster roaming PLMN by applying disaster roaming based on the application of the disaster condition. In addition, the UE may recognize information about a disaster area to which disaster roaming is applied while recognizing a disaster occurrence situation.

Upon recognizing information about a disaster occurrence according to the application of disaster conditions and/or a disaster area to which disaster roaming is applied, the communication layer of the UE may deliver to an upper layer and display the information, and related UI/UX operations are described in a third implementation to be described later.

2. Second Implementation

The UE performs a PLMN search to select another PLMN that can be used at the current location, and selects a PLMN other than the HPLMN where the disaster occurred. In this case, if the selected PLMN is a PLMN for disaster roaming (hereinafter referred to as a disaster roaming PLMN), the UE may perform the following operation. That is, when the UE successfully registers with the disaster roaming PLMN, the UE may stop the timer T for periodically searching the HPLMN. Stopping the timer T may be limited to a case in which the selected PLMN is a disaster roaming PLMN that is limitedly selected for disaster roaming, rather than a PLMN that can be selected without a separate condition. The UE may not perform periodic PLMN search to find the HPLMN until one of the conditions for restarting the timer T described later is satisfied. In this case, stopping the timer T may include not starting the timer T in the first place when the selected PLMN is a disaster roaming PLMN. Alternatively, when the UE is successfully registered with the disaster roaming PLMN, the UE may change and apply the value of the timer T for periodically searching the HPLMN. For example, the UE may adjust and apply a longer value of the timer T.

If the selected PLMN is a normal VPLMN rather than a disaster roaming PLMN, the UE may evaluate a time point at which the HPLMN becomes available again by considering a size of the area to which disaster roaming is applied when a disaster situation occurs and/or the candidate PLMNs in the current area, etc. Depending on the evaluation result, in the normal VPLMN, the timer T may be applied as a designated value or adjusted and applied longer than the designated value to increase a PLMN search period. Alternatively, the timer T may be stopped in the normal VPLMN according to the evaluation result as in the disaster roaming PLMN.

If the UE stops and/or does not start the timer T and stays in the disaster roaming PLMN and/or VPLMN and does not perform PLMN search, the communication layer of the UE may deliver information about this to an upper layer for indication, and related UI/UX operations are described in a third implementation to be described later.

In addition, if the user requests manual PLMN search and/or manual PLMN selection according to this information, the UE may perform manual PLMN search and/or manual PLMN selection without using a timer T according to the input. Related UI/UX operations are described in a third implementation to be described later.

The starting point of the timer T may be one of the followings.

1) A time point of camping on a new cell; or
2) A time point of selecting a PLMN other than HPLMN; or
3) A time point at which registration with the new PLMN is successful The conditions for restarting the timer T are as follows. If one of the conditions below is satisfied, the UE may restart timer T and perform PLMN search again.

1) when the UE Recognizes that the Disaster Situation has Ended in the HPLMN

The UE may receive a separate indicator from the disaster roaming PLMN and/or recognize that the disaster situation has ended in the HPLMN through a deregistration procedure initiated by the network in the disaster roaming PLMN. If the UE recognizes that the disaster situation has ended in the HPLMN, the UE may perform PLMN search again to search for the HPLMN, and restart the timer T regardless of the result. That is, when HPLMN is normally selected through PLMN search or when another PLMN (VPLMN) is selected instead of the HPLMN, interruption of timer T is canceled and timer T may be restarted. If HPLMN is selected as a result of PLMN search, timer T does not start, and if another VPLMN is selected, timer T may start again.

Upon recognizing that the disaster situation has ended in the HPLMN, the communication layer of the UE may deliver to an upper layer and display the information, and related UI/UX operations are described in a third implementation to be described later.

2) when the UE does not Recognize that the Disaster Situation has Ended in the HPLMN, but Moves to the Normal VPLMN When the UE is deregistered from the disaster roaming PLMN being served due to movement or other triggers, or when PLMN search is performed, HPLMN selection is still impossible, but another VPLMN may be selected. In this case, if the selected VPLMN is not a disaster roaming PLMN but a VPLMN with which a roaming agreement is normally established, the UE may restart the interrupted timer T. In this case, the default value of timer T can be applied temporarily large.

The communication layer of the UE that has moved from the disaster roaming PLMN to the normal VPLMN may deliver to an upper layer and display the information, and related UI/UX operations are described in a third implementation to be described later.

3) if the UE is Out of the Disaster Roaming Area

Disaster roaming PLMN may allow disaster roaming only in a limited area corresponding to an HPLMN's unserviceable area, not in the entire service area of the PLMN. Accordingly, when the UE, which has been serviced through the disaster roaming PLMN, leaves the limited area, it cannot receive service from the disaster roaming PLMN any longer, and thus, PLMN search may be performed again. In this case, the interrupted timer T may be restarted.

3. Third Implementation

Upon receiving various information related to disaster roaming from the AS layer of the UE, the NAS layer of the UE may provide various information related to disaster roaming to an upper layer, and the upper layer may display this to the user through the display (e.g., 114 in FIG. 4).

Figure 7:
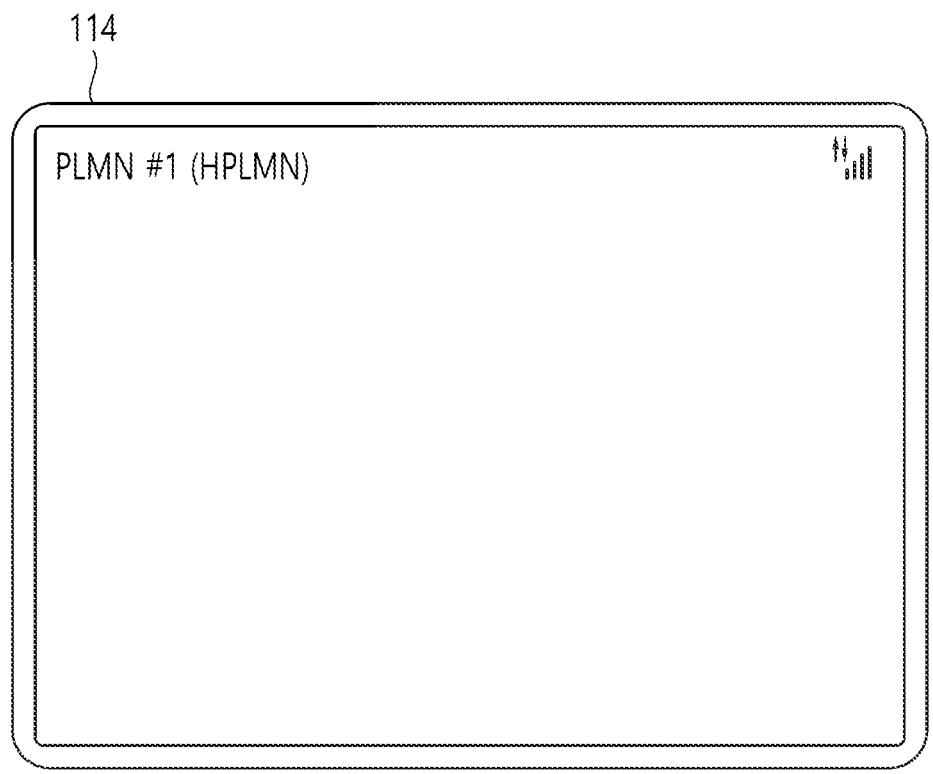
FIG. 7 shows an example of UI/UX to which implementations of the present disclosure is applied.

FIG. 7 shows an example of UI/UX to which implementations of the present disclosure is applied.

Referring to FIG. 7, a screen prior to the occurrence of a disaster is displayed to the user through the display of the UE (e.g., 114 in FIG. 4). It can be seen that the UE is currently receiving service through PLMN #1 (i.e., HPLMN).

Figure 8:
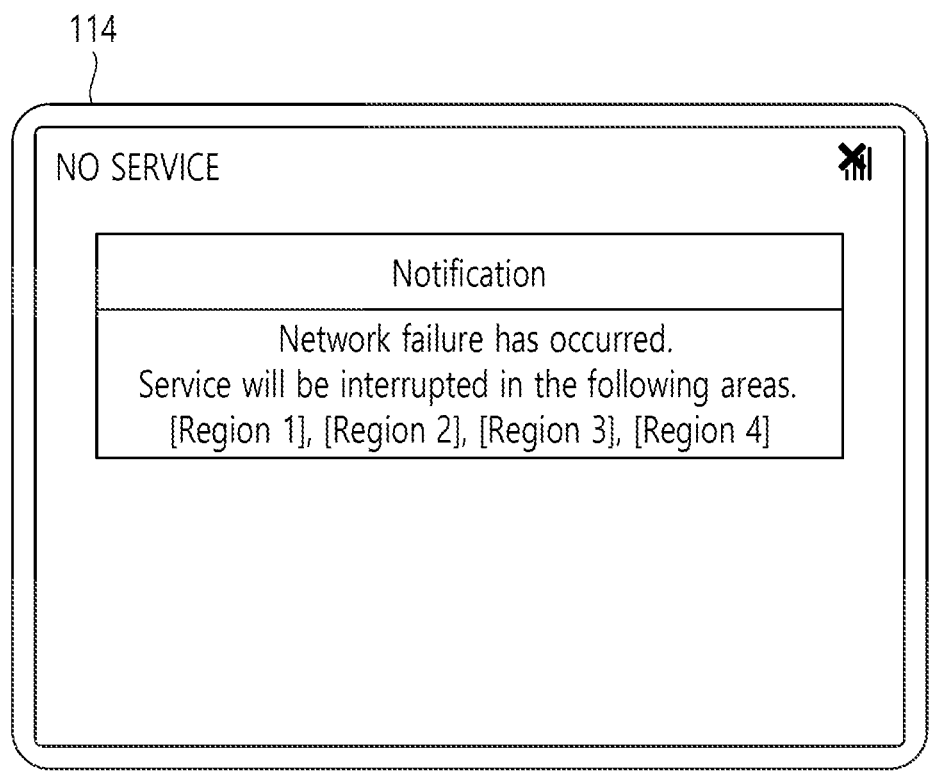
FIG. 8 shows another example of UI/UX to which implementations of the present disclosure is applied.

FIG. 8 shows another example of UI/UX to which implementations of the present disclosure is applied.

Referring to FIG. 8, when the UE receives information about a disaster area in which a disaster occurred, a message indicating that the service in HPLMN is no longer available ("Network failure has occurred") and a message about the area where the service is interrupted ("[Region 1], [Region 2], [Region 3], [Region 4]") is displayed to the user through the display of the UE (e.g., 114 in FIG. 4). The message displayed in FIG. 8 may correspond to the first information described in FIG. 6.

Figure 9:
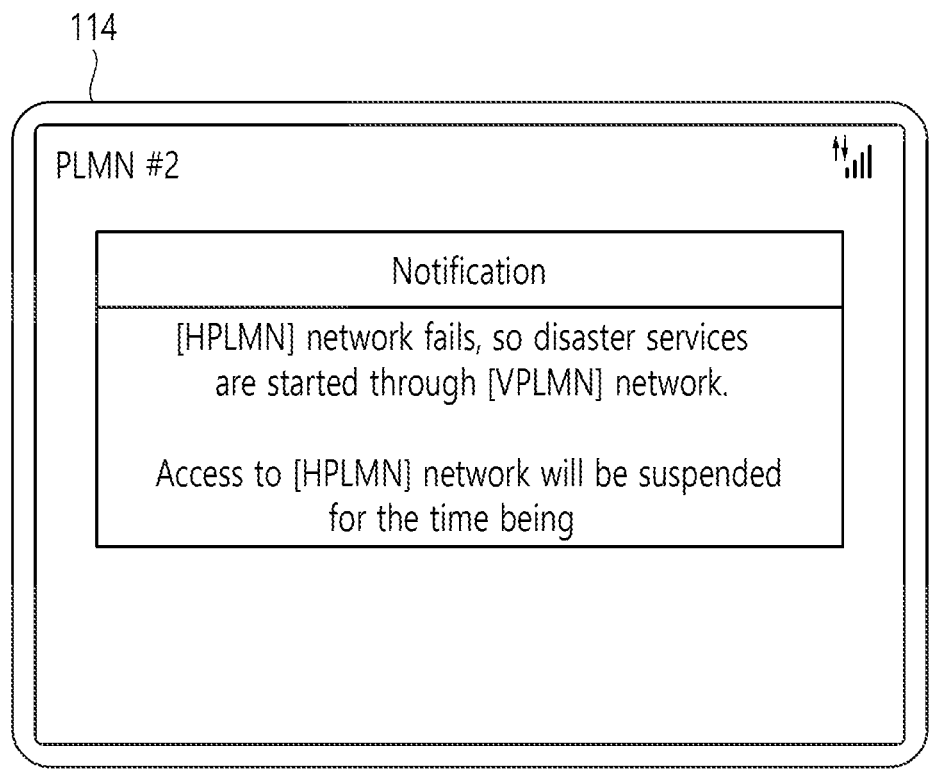
FIG. 9 shows another example of UI/UX to which implementations of the present disclosure is applied.

FIG. 9 shows another example of UI/UX to which implementations of the present disclosure is applied.

Referring to FIG. 9, upon receiving disaster occurrence information and/or disaster area information, the UE stops timer T for HPLMN search and, and at a time point where the disaster roaming service starts to be provided from the disaster roaming PLMN, information related thereto is displayed to the user through the display of the UE (e.g., 114 in FIG. 4). More specifically, a message for the VPLMN (i.e., PLMN #2) providing the disaster roaming service ("disaster services are started through [VPLMN] network") is displayed to the user, In addition, a message ("Access to [HPLMN] network will be suspended for the time being") indicating that attempts to access the HPLMN network will be suspended for a certain period of time due to the interruption of the timer T is displayed to the user. The messages displayed in FIG. 9 may correspond to the second information and the third information described in FIG. 6.

Figure 10:
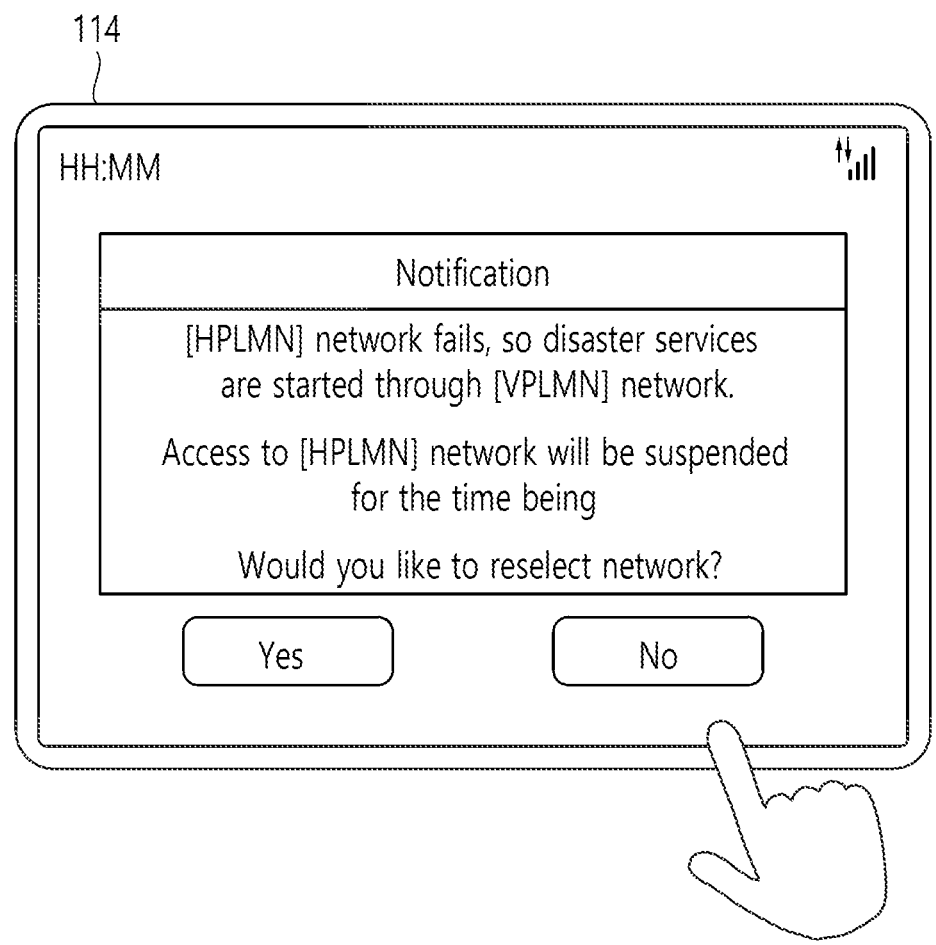
FIG. 10 shows another example of UI/UX to which implementations of the present disclosure is applied.

FIG. 10 shows another example of UI/UX to which implementations of the present disclosure is applied.

Referring to FIG. 10, in addition to the information displayed at the time point of starting to receive the disaster roaming service from the disaster roaming PLMN as shown in FIG. 9, a selection message ("Would you like to reselect network?") allowing the user to select network reselection is displayed to the user through the display of the UE (e.g., 114 in FIG. 4). Accordingly, regardless of whether the timer T is used or not, depending on the user's selection, the UE may perform PLMN search again and/or operate without periodic HPLMN search.

Figure 11:
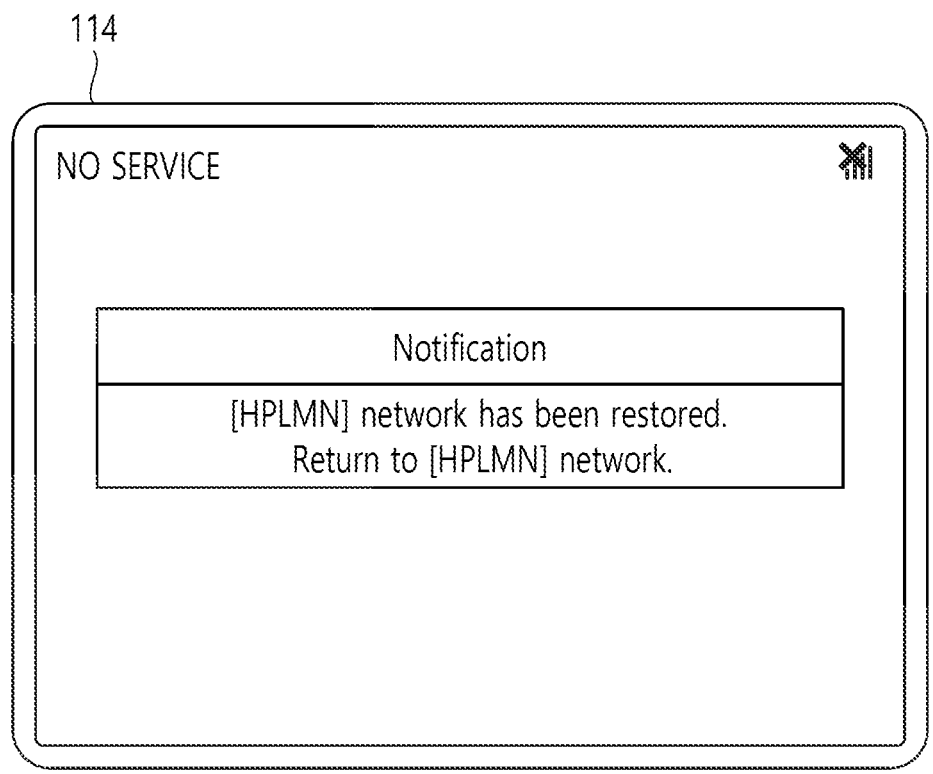
FIG. 11 shows another example of UI/UX to which implementations of the present disclosure is applied.

FIG. 11 shows another example of UI/UX to which implementations of the present disclosure is applied.

Referring to FIG. 11, when the communication layer of the UE receives/recognizes that a disaster situation in the HPLMN has ended, information related thereto is displayed to the user through the display of the UE (e.g., 114 in FIG. 4). Specifically, a message indicating that the disaster situation on HPLMN has ended or has been restored ("[HPLMN] network has been restored") and a message indicating that this resulted in a disconnection from the disaster roaming PLMN and the user will then return to the HPLMN ("Return to [HPLMN] network") is displayed to the user. The message displayed in FIG. 11 may correspond to the fourth information described in FIG. 6.

Figure 12:
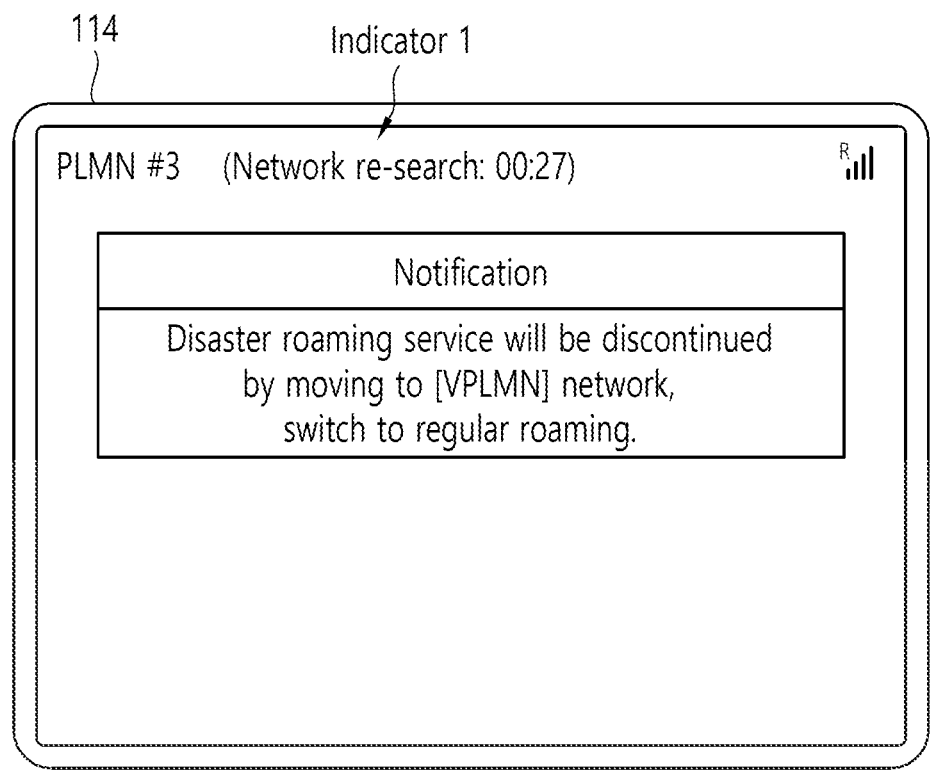
FIG. 12 shows another example of U/UX to which implementations of the present disclosure is applied.

FIG. 12 shows another example of UI/UX to which implementations of the present disclosure is applied.

Referring to FIG. 12, when a UE moves to and is registered with a normal roaming PLMN rather than the disaster roaming PLMN, information indicating that the disaster roaming service has been stopped is displayed to the user through the display of the UE (e.g., 114 in FIG. 4). Specifically, a message ("Disaster roaming service will be discontinued by moving to [VPLMN] network, switch to regular roaming") indicating that the UE moves to the normal roaming PLMN, the disaster roaming service is stopped, and the transition to normal roaming is performed is displayed to the user.

When the timer T is restarted as the UE moves to the normal roaming PLMN, the next PLMN search time information (i.e., the remaining time of the timer T) may be displayed as indicator 1 to the user through the display of the UE (e.g., 114 in FIG. 4). The indicator 1 may be displayed in seconds or minutes in real time, and/or in approximate time units (e.g., 10 minutes or 1 hour). The indicator 1 may be displayed on an upper part of a display. The location where the indicator 1 is displayed on the display is only an example, and the indicator 1 may be displayed on the lower part of the display or may be displayed on the upper or lower part of the display for a certain period of time only when the user inputs an input to check the indicator 1.

The present disclosure can have various advantageous effects.

For example, when adjusting the timer T for HPLMN search due to the occurrence of disaster roaming, various related information can be effectively displayed to the user through the display.

For example, when a disaster situation occurs in a 5G system, it is possible to prevent the UE from unnecessarily searching for the HPLMN while receiving service through the PLMN for disaster roaming.

For example, it is possible to prevent service interruption or unnecessary power consumption in a disaster roaming PLMN due to unnecessary HPLMN search.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In the present disclosure, "A or B" may mean "only A", "only B", or "both A and B". In other words, "A or B" in the present disclosure may be interpreted as "A and/or B". For example, "A, B or C" in the present disclosure may mean "only A". "only B", "only C", or "any combination of A. B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user equipment (UE) adapted to operate in a wireless communication system, the method comprising;
    registering with a Home Public Land Mobile Network (HPLMN);
    determining that a disaster condition applies to the HPLMN;
    selecting a disaster roaming PLMN;
    performing a first registration procedure for disaster roaming services on the disaster roaming PLMN;
    based on the UE being registered for the disaster roaming services, periodically attempting to obtain service on the HPLMN based on a timer T with a first value;
    selecting a Visited PLMN (VPLMN);
    performing a second registration procedure on the VPLMN; and
    based on the UE being in the VPLMN and not being registered for the disaster roaming services, periodically attempting to obtain service on the HPLMN based on the timer T with a second value.

2. The method of claim 1, wherein the disaster condition is a problem in an interface between a radio access network (RAN) node of the HPLMN and a core network related to the HPLMN.

3. The method of claim 1, wherein a disaster area is recognized based on the application of the disaster condition to the HPLMN.

4. The method of claim 1, wherein the method further comprises evaluating a time point at which the HPLMN becomes available again, after selecting the VPLMN.

5. The method of claim 4, wherein the time point at which the HPLMN becomes available again is evaluated based on a size of a disaster area and/or candidate PLMNs within the disaster area.

6. The method of claim 1, wherein the UE is in communication with at least one of a mobile device, a network, and/or autonomous vehicles other than the UE.

7. The method of claim 1, wherein the first value is longer than the second value.

8. The method of claim 1, wherein selecting the VPLMN comprises at least one of i) the UE recognizing that the disaster condition no longer applying to the HPLMN, ii) the UE moving from the disaster roaming PLMN to the VPLMN, or iii) the UE leaving a disaster area in the disaster roaming PLMN.

9. The method of claim 1, wherein the method further comprises:
    displaying first information informing that the disaster condition applies to the HPLMN;
    displaying second information informing that the disaster roaming PLMN or the VPLMN has been selected.

10. A User Equipment (UE) adapted to operate in a wireless communication system, the UE comprising:
    at least one display;
    at least one transceiver;
    at least one processor; and
    at least one memory operably connectable to the at least one processor and storing instructions that, based on being executed by the at least one processor, perform operations comprising:
    registering with a Home Public Land Mobile Network (HPLMN);
    determining that a disaster condition applies to the HPLMN;
    selecting a disaster roaming PLMN;
    performing a first registration procedure for disaster roaming services on the disaster roaming PLMN;
    based on the UE being registered for the disaster roaming services, periodically attempting to obtain service on the HPLMN based on a timer T with a first value;
    selecting a Visited PLMN (VPLMN);
    performing a second registration procedure on the VPLMN; and
    based on the UE being in the VPLMN and not being registered for the disaster roaming services, periodically attempting to obtain service on the HPLMN based on the timer T with a second value.

11. The UE of claim 10, wherein the disaster condition is a problem in an interface between a radio access network (RAN) node of the HPLMN and a core network related to the HPLMN.

12. The UE of claim 10, wherein a disaster area is recognized based on the application of the disaster condition to the HPLMN.

13. The UE of claim 10, wherein the operations further comprise evaluating a time point at which the HPLMN becomes available again, after selecting the VPLMN.

14. The UE of claim 13, wherein the time point at which the HPLMN becomes available again is evaluated based on a size of a disaster area and/or candidate PLMNs within the disaster area.

15. A processing apparatus adapted to control a wireless device in a wireless communication system, the processing apparatus comprising:
  at least one processor; and
  at least one memory operably connectable to the at least one processor,
  wherein the at least one processor is adapted to perform operations comprising:
  registering with a Home Public Land Mobile Network (HPLMN);
  determining that a disaster condition applies to the HPLMN;
  selecting a disaster roaming PLMN;
  performing a first registration procedure for disaster roaming services on the disaster roaming PLMN;
  based on the wireless device being registered for the disaster roaming services, periodically attempting to obtain service on the HPLMN based on a timer T with a first value;
  selecting a Visited PLMN (VPLMN);
  performing a second registration procedure on the VPLMN; and
  based on the wireless device being in the VPLMN and not being registered for the disaster roaming services, periodically attempting to obtain service on the HPLMN based on the timer T with a second value.

* * * * *